Nov. 28, 1939.    L. A. WOOD ET AL    2,181,717
BRAKE CONTROL FOR AUTOMOTIVE VEHICLES
Filed May 10, 1937
Fig. 1.
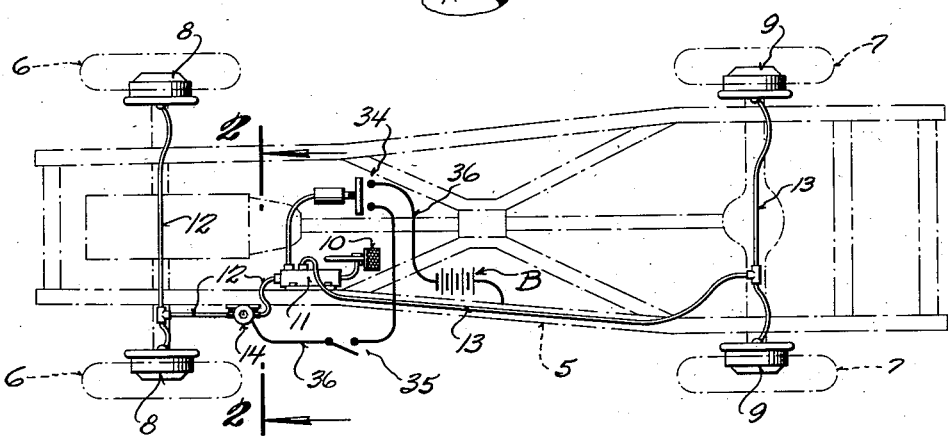
Fig. 3.
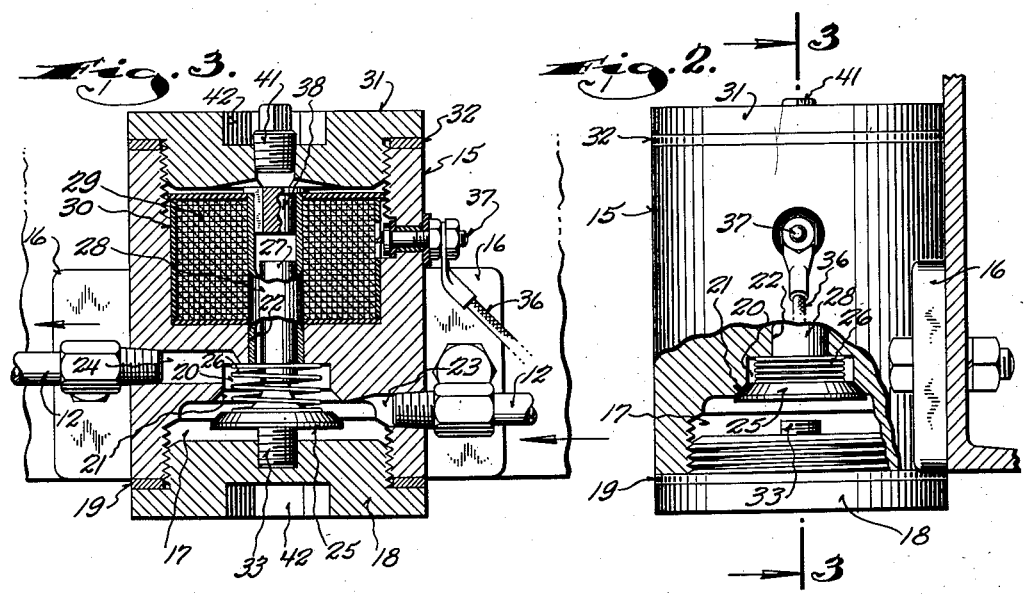
Fig. 2.
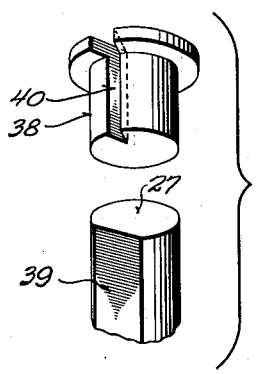
Fig. 4.
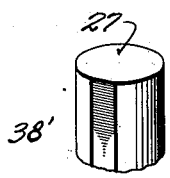
Fig. 5.
Inventors
Leo A. Wood
Wallace E. Weller Patented Nov. 28, 1939

2,181,717

UNITED STATES PATENT OFFICE 2,181,717

BRAKE CONTROL FOR AUTOMOTIVE VEHICLES

Leo A. Wood and Wallace E. Weller, Fond du Lac, Wis.

Application May 10, 1937, Serial No. 141,722

11 Claims. (Cl. 188—152)

This invention relates to improvements in braking systems for automobiles and the like.

As is well known automotive vehicles are now generally equipped with four-wheel brakes, and in the heavier trucks and buses the brakes are usually of the pneumatic or hydraulic type. Under certain circumstances, especially on slippery pavements the application of the front-wheel brakes is undesirable and dangerous. The load on the front wheels is considerably less than that carried by the rear wheels, hence the traction at the front wheels is insufficient to prevent them from locking when the brakes are applied. With the front wheels locked the driver has practically no control over the vehicle. Steering is without effect, and a skid is the result. To overcome this dangerous condition truck operators have in the past completely disconnected the front-wheel brakes from the braking system, but this obviously is undesirable as it entails a loss in braking efficiency.

It is therefore a general object of this invention to provide means under the control of the driver of the automobile or truck by which he may entirely disconnect the front-wheel brakes whenever road conditions make this advisable.

As the pressures employed in pneumatic and hydraulic braking systems, especially on the heavier trucks, is high, and as even the slightest leak in the system must be carefully guarded against, any device used to disconnect the front-wheel brakes from the central pressure source must be secure against the development of leaks, and with this point in view the invention has as another of its objects to provide a valve device for disconnecting the front-wheel brakes which is entirely self-contained and has no operating parts breaking into the fluid pressure system.

In this respect it is a more specific object of this invention to provide an electromagnetically actuated valve for disconnecting the front-wheel brakes so that no moving parts need project from the exterior into the fluid pressure system.

It is also an object of this invention to control the energization of the electromagnet which actuates the valve, from a pressure responsive switch which closes upon depression of the brake pedal, and to provide switch means in series with the pressure responsive switch for selectively determining when the pressure responsive switch is to be effective.

Still another object of this invention resides in the provision of a device of the character described which may be used to effect partial application of the front-wheel brakes.

A further object of this invention is to provide a device of the character described which is sufficiently sturdy to withstand the heavy usage to which large transport trucks and buses are subjected, and which is simple in design and readily installed on any vehicle equipped with a pressure operated braking system.

With the above and other objects in view which will appear as the description proceeds, this invention resides in the novel construction, combination and arrangement of parts substantially as hereinafter described and more particularly defined by the appended claims, it being understood that such changes in the precise embodiment of the herein disclosed invention may be made as come within the scope of the claims.

The accompanying drawing illustrates one complete example of the physical embodiment of the invention constructed according to the best mode so far devised for the practical application of the principles thereof, and in which:

Figure 1 is a diagrammatic top plan view of an automobile or truck chassis equipped with a fluid pressure braking system and illustrating the application of this invention thereto;

Figure 2 is a sectional view taken through Figure 1 on the plane of the line 2—2; and having parts broken away and in section;

Figure 3 is a longitudinal sectional view taken through Figure 2 on the plane of the line 3—3;

Figure 4 is a fragmentary perspective view illustrating certain details of the device; and Figure 5 is a fragmentary perspective view illustrating the armature construction when it is intended to retard the closure of the valve.

Referring now particularly to the accompanying drawing in which like numerals designate like parts throughout the several views, the numeral 5 represents the chassis of any conventional automobile or truck equipped with front wheels 6 and rear wheels 7. The front wheels 6 are equipped with brakes 8, and the rear wheels 7 with brakes 9. Both sets of brakes are fluid pressure operated either hydraulically or pneumatically simultaneously upon depression of a brake pedal 10.

As is well known the depression of the brake pedal by the driver transmits an operating fluid pressure from a central source 11 to the brakes 8 and 9. Each set of brakes is separately connected with the pressure source 11, a pressure line 12 leading from the source 11 to the front-wheel brakes and a pressure line 13 connecting the pressure source with the rear-wheel brakes.

Under all ordinary circumstances both lines 12 and 13 should be open so that the actuation of the brake pedal 10 applies both the rear- and front-wheel brakes. As hereinbefore mentioned, however, it is desirable at times, as when the pavement is slippery, to disconnect the front-wheel brakes. To this end a control device indicated generally by the numeral 14 is interposed in the pressure line 12.

The construction of the control device, (as clearly shown in Figures 2 and 3), is such that it forms an integral part of the pressure line 12. It has no moving parts leading from the outside into the fluid circuit, hence, there is no possibility of leakage which is of vital concern in all fluid pressure braking systems.

It consists of a substantially cylindrical casing 15, preferably a casting, provided with attaching lugs 16 by which the device may be secured to the chassis. In its lower end the casing 15 has a valve chamber 17 closed at its bottom by a cover 18 which is threaded into the casing with a suitable gasket 19 interposed therebetween to make the junction of the cover and casing leak-proof. Formed in the top of the chamber 17 is a dome 20, the rim of which provides a valve seat 21, and extending up from the center of the dome 20 is a bore 22, for a purpose to be hereinafter more fully described.

Opening to the valve chamber 17 is an inlet 23 and leading from the dome 20 is an outlet 24. The inlet and outlet provide for the connection of the pressure line 12 so that the chamber 17 and the dome 20 form in effect an integral part of the fluid system.

Movable in the chamber 17 is a valve 25 adapted to engage the seat 21 to shut off communication between the inlet and outlet. The valve 25 is biased to an open position by gravity assisted by a spring 26 confined between the top of the dome 20 and the valve.

Extending up from the valve 25 is an armature 27 which extends into the bore 22. The valve and the armature 27 are preferably formed of a suitable ferrous metal and as the casing 15 is also preferably formed of ferrous metal, the bore 22 is lined with a sleeve 28 of non-ferrous metal.

The sleeve 28 extends through a solenoid 29 positioned in a hollow chamber 30 formed in the upper end of the casing. This chamber is closed by a cover 31 which is preferably threaded into the casing and has a gasket 32 interposed between it and the casing to provide a leak-proof junction the same as that at the bottom of the casing.

From the description thus far it will be evident that upon energization of the solenoid 29, the attraction of the armature 27 to it will close the valve 25 and disconnect the front-wheel brakes from the fluid pressure source.

To guard against magnetically freezing the valve 25 against the bottom cover 18, a non-ferrous metal plug 33 is secured in the cover to hold the valve 25 spaced a slight distance therefrom when in its open position.

Energization of the solenoid is effected by the closure of a fluid pressure responsive switch 34 which is closed whenever the brake pedal is depressed, but inasmuch as it is desirable to disconnect the front-wheel brakes only when road conditions are bad, another switch 35 connected in series with the fluid pressure responsive switch is provided. The switch 35 is conveniently located in the driver's compartment.

With the switch 35 closed, each depression of the brake pedal, by closing the switch 34, completes the energizing circuit, which is as follows: from a battery B a conductor 36 leads to one side of the solenoid through a terminal 37 on the control device. The terminal 37 passes through, but is insulated from the wall of the casing and has its inner end electrically connected to one side of the solenoid. The other side of the solenoid is grounded, and as one terminal of the battery is also grounded, closure of the two switches completes the energizing circuit.

To provide a better iron circuit for the electromagnet, a ferrous metal plug 38 is inserted into the upper end of the sleeve 28 with its inner end so spaced with respect to the adjacent end of the armature that a slight clearance is left therebetween when the valve is closed.

If it is desired to completely disconnect the front-wheel brakes, immediate closure of the valve 25 is necessary. Hence, any dashpot action which would be caused by the armature moving in the sleeve 28 must be avoided, and to this end, one side of the armature is flattened as at 39 (see Figure 4).

By lessening the amount cut off the side of the armature as at 38' in Figure 5, the response of the valve can be retarded so that a partial application of the front-wheel brakes may be effected. This lends great flexibility to the device and permits its use in lighter cars where a certain balance of braking efficiency as between the front and rear-wheel brakes is desirable on slippery roads.

If the device is used in a hydraulic system, it is essential that all air be excluded from the pressure lines and to this end, the plug 38 has a longitudinal slit 40 and a port closed by a removable plug 41 is provided in the top cover 31. By removing the plug 41 after the device has been installed and causing the fluid to flow into and fill the entire interior of the casing until it runs through the port before the plug 41 is re-inserted, all air will be positively excluded from the system.

Any suitable means may be provided for applying a tool to the covers 18 and 31 for the purpose of tightening and loosening the same and in the present instance hexagonal sockets 42 are formed in their outer faces.

From the foregoing description taken in connection with the accompanying drawing, it will be readily apparent that this invention provides a simple sturdy device for completely or partially disconnecting the front-wheel brakes of an automobile or truck whenever desired and that the very essential requirement of keeping the fluid system closed is not traversed.

What we claim as our invention is:

1. In combination with an automotive vehicle equipped with four-wheel brakes: fluid pressure operated means for applying said brakes, said means including a central source of fluid pressure under the control of the operator and connections leading from said central source to the brakes; valve means interposed in the connection between said central source and the front-wheel brakes for disconnecting said front-wheel brakes from said pressure source; electromagnetic means for actuating said valve; and means operable upon a rise in pressure at said source for controlling energization of said electromagnetic means.

2. In combination with a vehicle equipped with fluid pressure operated brakes controlled by a depressible brake pedal: electroresponsive means for rendering certain of said brakes inoperable; and switch means operable upon depression of the brake pedal for controlling energization of said electroresponsive means.

3. In combination with a vehicle equipped with fluid pressure operated brakes adapted to be applied upon depression of a brake pedal: a valve for rendering certain of said brakes inoperable; electroresponsive means for actuating the valve; and an energizing circuit for said electroresponsive means including a switch responsive to depression of the brake pedal, and another switch in series therewith and readily accessible to the operator of the vehicle.

4. In combination with a vehicle equipped with fluid pressure operated brakes: a source of fluid pressure for operating said brakes; a valve interposed between certain of said brakes and said source and adapted to disconnect the brakes from said source; electromagnetic means for actuating the valve; and means for retarding the response of the valve so that said certain brakes are partially applied before the valve disconnects the same from the fluid pressure source.

5. In combination with an automobile vehicle equipped with four-wheel brakes: fluid pressure operated means for applying said brakes, said fluid pressure operated means including a central source of fluid pressure; and connections leading separately from said central source to the front-wheel brakes and the rear-wheel brakes; a closed valve casing interposed in the connection between said central source and the front-wheel brakes; a movable valve in said casing operable to a closed position shutting off communication between said central source and the front-wheel brakes and yieldingly biased to an open position permitting communication between the pressure source and the front-wheel brakes; cooperating parts forming a dashpot structure, one of which is connected to the valve so that the dashpot action thereof retards closure of the valve, said part which is connected to the valve also constituting an armature; and a solenoid adapted to be energized to attract the armature part and move the valve to closed position with a speed determined by the dashpot action of said cooperating parts.

6. In combination with a vehicle equipped with fluid pressure operated brakes: electroresponsive means for rendering certain of said brakes inoperable; and means responsive to the fluid pressure which operates the brakes for controlling energization of said electroresponsive means.

7. In combination with a vehicle equipped with fluid pressure operated brakes controlled by a depressible brake pedal: electroresponsive means for rendering certain of said brakes inoperable; and control instrumentalities for governing the operation of said electroresponsive means including a pair of electric switches, and means operable upon a rise in fluid pressure for closing one of said switches, the other of said switches being readily accessible to the operator of the vehicle and in series with said first named switch so that energization of said electroresponsive means is dependent upon the closure of said last named switch.

8. In combination with a vehicle equipped with fluid pressure operated brakes: electroresponsive means for rendering certain of said brakes inoperable; means under control of the operator of the vehicle for effecting energization of said electroresponsive means; and a separate control readily accessible to the operator of the vehicle for rendering said last named means ineffective.

9. In combination with an automotive vehicle equipped with four-wheel brakes controlled by a depressible brake pedal: a central source of fluid pressure controlled by actuation of the brake pedal: connections leading separately from said central source to the rear-wheel brakes and to the front-wheel brakes: a closed valve casing interposed in the connection between said central source and the front-wheel brakes; a movable valve in said casing operable to a closed position shutting off communication between said central source and the front-wheel brakes and yieldingly biased to an open position permitting communication between the pressure source and the front wheel brakes; an electromagnet encased within said valve casing; an armature connected with the valve and disposed in magnetic relationship to the electromagnet so that energization thereof closes the valve; and an energizing circuit for the electromagnet having two switches connected in series so that energization of the electromagnet is dependent upon closure of both of said switches, one of said switches being readily accessible to the operator of the vehicle, and the other being controlled by actuation of the brake pedal.

10. In a fluid pressure operated braking system for automobiles and the like: a source of fluid pressure; connections leading from said source to the individual brakes; a closed valve casing interposed in the connection between said pressure source and certain of the brakes so that said closed casing forms an integral part of the line of communication between said brakes and the pressure source; a valve in said casing biased to an open position and adapted, when closed, to shut off communication between said brakes and the pressure source; electroresponsive means for closing said valve; means under control of the operator of the automobile for effecting energization of said electroresponsive means; and a separate control readily accessible to the operator of the automobile for rendering said last named means ineffective.

11. In a fluid pressure operated braking system for automobiles and the like having a depressible brake pedal: a fluid pressure source controlled by actuation of the brake pedal; connections leading from said pressure source to the different brakes: means interposed in the connection between the pressure source and certain of the brakes for disconnecting said certain brakes, said means comprising, a closed casing having a valve chamber provided with an inlet and an outlet by which said valve chamber is connected in the fluid pressure line leading from the pressure source to said brakes; a valve movable in said chamber and biased to an open position and adapted when closed to shut off communication between the inlet and outlet of the chamber; a solenoid disposed within said casing; an armature connected with the valve and slidable in the solenoid so that energization of the solenoid effects closure of the valve; and an electric circuit for the solenoid having a plurality of separate switches connected in series so that energization of the solenoid is dependent upon closure of all of said switches, one of said switches being readily accessible to the operator of the automobile, and another being controlled by actuation of the brake pedal.

LEO A. WOOD.
WALLACE E. WELLER.